United States Patent
Gao et al.

(10) Patent No.: US 11,797,875 B1
(45) Date of Patent: Oct. 24, 2023

(54) MODEL COMPRESSION FOR SELECTING CONTENT

(71) Applicant: Meta Platforms, Inc., Menlo Park, CA (US)

(72) Inventors: Tianshi Gao, Fremont, CA (US); Wenlin Chen, Mountain View, CA (US); Liang Xiong, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 591 days.

(21) Appl. No.: 15/938,882

(22) Filed: Mar. 28, 2018

(51) Int. Cl.
*G06N 20/00* (2019.01)
*G06Q 30/0242* (2023.01)
*G06Q 30/0273* (2023.01)
*G06Q 30/0251* (2023.01)

(52) U.S. Cl.
CPC ........... *G06N 20/00* (2019.01); *G06Q 30/0242* (2013.01); *G06Q 30/0251* (2013.01); *G06Q 30/0273* (2013.01)

(58) Field of Classification Search
CPC ............ G06Q 30/0251; G06Q 30/0273; G06Q 30/00; G06Q 30/0242
See application file for complete search history.

(56) References Cited

U.S. PATENT DOCUMENTS

| | | | | |
|---|---|---|---|---|
| 9,892,431 B1* | 2/2018 | Agrawal et al. | ....... | H04L 51/04 |
| 10,176,435 B1* | 1/2019 | Sarkar et al. | ......... | G06N 20/00 |
| 2013/0204664 A1* | 8/2013 | Romagnolo et al. | ..................... | G06Q 30/0203 |
| | | | | 705/7.32 |
| 2014/0280214 A1* | 9/2014 | Han et al. | ........... | G06F 16/9535 |
| | | | | 707/748 |

(Continued)

OTHER PUBLICATIONS

AUTHOR(S):Arel, Itamar; Title: Deep machine learning - A new frontier in artificial intelligence research Journal: Research F [online]. Publication date: 2010 [retrieved on: Apr. 28, 2022]. Retrieved from the Internet: < URL: https://ieeexplore.ieee.org/stamp/stamp.jsp?arnumber=5605630 (Year: 2010).*

AUTHOR(S):Barshan, Elnaz; Fieguth, Paul . Title: Stage-wise Training: An improved feature learning strategy for deep models Journal: JMLR [online]. Publication date: 2015 [retrieved on: Aug. 26, 2021]. Retrieved from the Internet: < URL: http://proceedings.mlr.press/v44/Barshan2015.pdf> (Year: 2015).*

(Continued)

*Primary Examiner* — Michael W Schmucker
*Assistant Examiner* — Alfred H Tsui
(74) *Attorney, Agent, or Firm* — Fenwick & West LLP

(57) ABSTRACT

To present one or more content items to users of an online system, the online system identifies a content evaluation pipeline including an order of a plurality of stages having one or more computer models for evaluating a likelihood of user interaction with a content item. The content evaluation pipeline selects a decreasing number of content items, from each stage of the order, according to the order of the stages. The online system optimizes the selection of content items selected at the plurality of stages of the content evaluation pipeline by training the computer models to predict content selection values that the subsequent model would generate for a content items in a training data set and content items that the subsequent model would select for input to the next stage of the content evaluation pipeline.

17 Claims, 5 Drawing Sheets

(56) References Cited

U.S. PATENT DOCUMENTS

| | | | | |
|---|---|---|---|---|
| 2015/0169746 | A1* | 6/2015 | Hatami-Hanza | G06F 16/367 706/18 |
| 2017/0206457 | A1* | 7/2017 | Roychowdhury et al. | G06N 20/00 |
| 2018/0176081 | A1* | 6/2018 | Zhong et al. | H04N 1/00204 |
| 2019/0172224 | A1* | 6/2019 | Vajda | G06N 3/045 |

OTHER PUBLICATIONS

AUTHOR(S):Barshan; Title: Stage wise training Journal: JMLR [online]. Publication date: 2015 [retrieved on: Apr. 21, 2023]. Retrieved from the Internet: < URL: http://proceedings.mlr.press/v44/Barshan2015.pdf > (Year: 2015).*

AUTHORS(S):C. Perlich. Title: Machine learning for targeted display advertising: transfer learning in action Journal:Mach Learn [online]. Publication date: 2012 [retrieved on: Aug. 27, 2021]. Retrieved from the Internet: < URL: https://link.springer.com/content/pdf/10.1007/s10994-013-5375-2.pdf (Year: 2012).*

AUTHOR(S):Li, Luxi; Title: Deep Reinforcement Learning Journal: Arxiv [online]. Publication date: 2017 [retrieved on: Apr. 20, 2023]. Retrieved from the Internet: < URL: https://arxiv.org/abs/1701.07274 (Year: 2017).*

* cited by examiner

US 11,797,875 B1

MODEL COMPRESSION FOR SELECTING CONTENT

BACKGROUND

This disclosure relates generally to presenting content to users of an online system, and more specifically to generating a feed of content for presentation to a user of the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Many online systems receive compensation from a publishing user for presenting online system users with certain types of content provided by the publishing user. Frequently, online systems charge a publishing user for each presentation of content to an online system user or for each interaction with content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

However, selecting relevant content for a particular user from among a very large (e.g., 10,000) number of content items may be challenging to perform in an effective and accurate manner. The effectiveness of this computation may depend on the ability of models in a content evaluation pipeline to accurately select content items for input to the subsequent model. Since the complexities of these models may differ, filtering a large number of content items for those that are likely to be of high value for a given user is challenging. A less complex model at an early stage in the content evaluation pipeline might filter out a content item that would have been selected by a more complex model at a later stage in the pipeline, resulting in loss of relevant content to select between the stages of the content selection process and in the ultimate selection of content items for display to the user.

SUMMARY

To present one or more content to users of an online system, the online system identifies a content evaluation pipeline configured to select one or more content items that the users are more likely to interact with. The online system includes an order of a plurality of stages having one or more computer models for evaluating a likelihood of user interaction with a content item. The content evaluation pipeline selects a decreasing number of content items in each stage of the pipeline to continue to the next stage. One example content evaluation pipeline has three stages. The first stage of the content evaluation pipeline receives 10,000 content items, and a first stage model ranks the 10,000 content items based on the evaluated likelihood of user interaction with each of the 10,000 content items, and selects top 800 content items as an input for a second stage model. The second model evaluates these 800 content items to subsequently outputs 200 content items, and a third stage model receives the 200 content items as an input and outputs 3 content items for display to the user.

To optimize the content evaluation pipeline and select the most high-value content items for a given user, the online system trains the models to mimic the output of the subsequent model in the pipeline. A pipeline training module generates a first training set of content items for which a given user satisfies targeting criteria and inputs the first training set to the second stage model for evaluation. For each of the content items in the first training set, the second stage model generates a content selection value or range of values representing a likelihood that the given user will interact with the content items and an amount of compensation that the online system would receive as a result of the interaction. The content selection values are output by the second stage model, along with an indication of which of the content items in the first training set would be selected (by the second stage model) for evaluation by the third stage model. The first stage model is then trained with the content selection values in the first training set, such that the first stage model learns to output values similar to those of the second stage model.

The pipeline training module similarly trains the second stage model to predict the content selection value or range of values that the third stage model would calculate for each content item and which three content items the third stage model would select for display to the user. Content items in a second training set are input to the third stage model, which outputs content selection values or ranges of values and an indication of which content items from the second training set would be selected for output to the user. Responsive to receiving the output of the third stage model, the pipeline training module trains the second stage model with the content selection values in the second training set to mimic the output of the third stage model. In other embodiments, the pipeline training module trains the models in the content evaluation pipeline from most to least complex (i.e., trains the third stage model, then trains the second stage model based on predicted values from the trained third stage model, then trains the first stage model based on predicted values from the trained second stage model.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

An online system uses a content evaluation pipeline to select one or more content items that a user of an online system is more likely to interact with. The content evaluation pipeline includes an order of a plurality of stages having one or more computer models for evaluating a likelihood of user interaction with a content item. The content evaluation pipeline selects a decreasing number of content items, from each stage of the order, according to the order of the stages in the order.

Figure 1A:
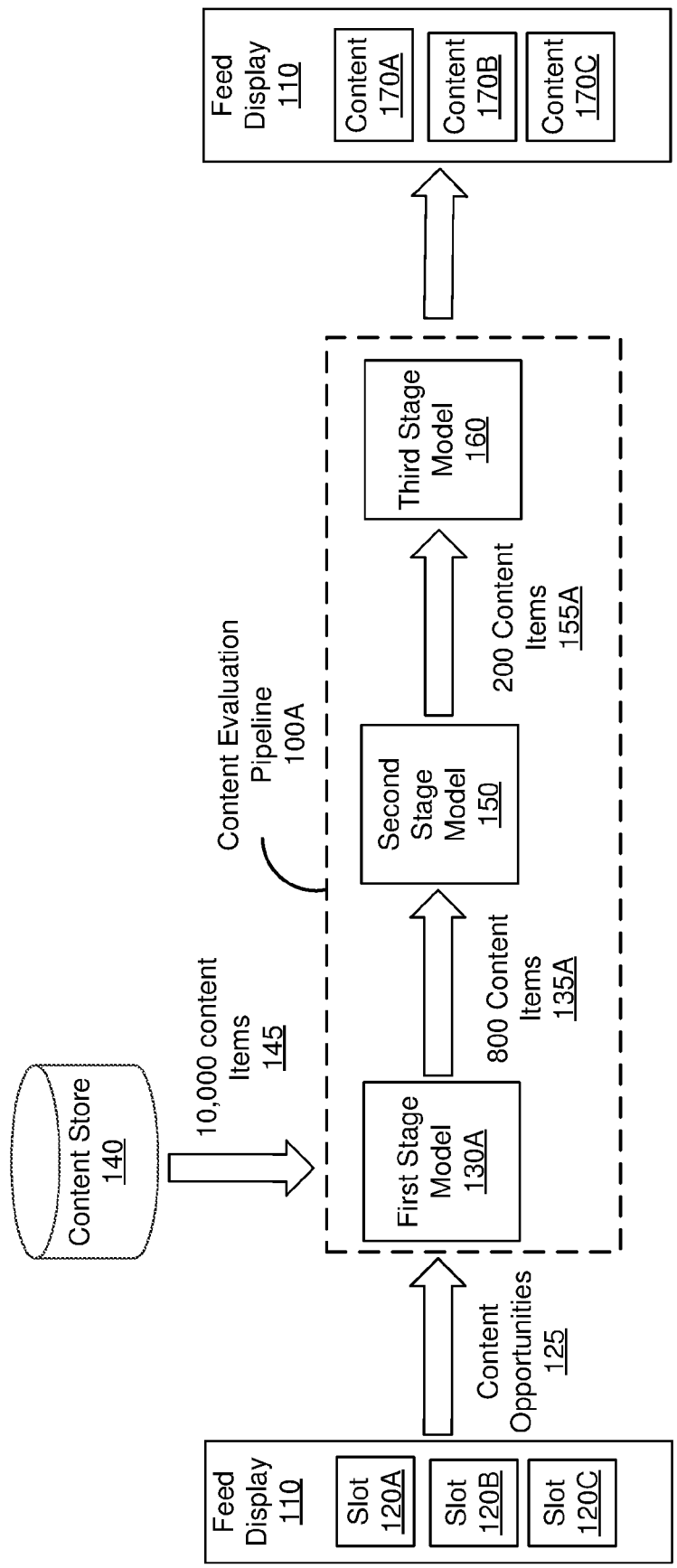
FIG. 1A is a block diagram of an environment where a content evaluation pipeline operates, in accordance with an embodiment.

FIG. 1A is a block diagram of an environment where a content evaluation pipeline 100A operates, in accordance with an embodiment. In the embodiment of FIG. 1A, a feed display 110 has three available slots (e.g. 120A, 120B, and 120C) to generate content opportunities 125. In this example, the content store 140 provides 10,000 content items 145 (e.g., social networking content items and advertisements) to the content evaluation pipeline 100A. The content evaluation pipeline 100A ultimately selects three content items 170A, 170B and 170C for the three available slots in the feed display 110. The content evaluation pipeline 100A includes three stages, each having a computer model (e.g., a first stage model 130A, a second stage model 150, and a third stage model 160) for evaluating a likelihood of a user interaction with a content item. The content evaluation pipeline 100A selects a decreasing number of content items, from each stage of the order, according to the order of the stages in the order. In this example, the first stage model 130A receives the 10,000 content items 145 from the content store 140 and ranks the 10,000 content items based on the evaluated likelihood of user interaction with each of the 10,000 content items, and selects top 800 content items 135A as an input for the second stage. The top one content item of the top 800 content items 135A is a content item that the user is most likely to interact with. The second stage model 150 uses the 800 content items 135A as an input and selects 200 content items 155A as an input for the third stage model 160. The third stage model 160 selects top three content items 170A, 170B and 170C for presenting in the feed display 110.

Figure 1B:
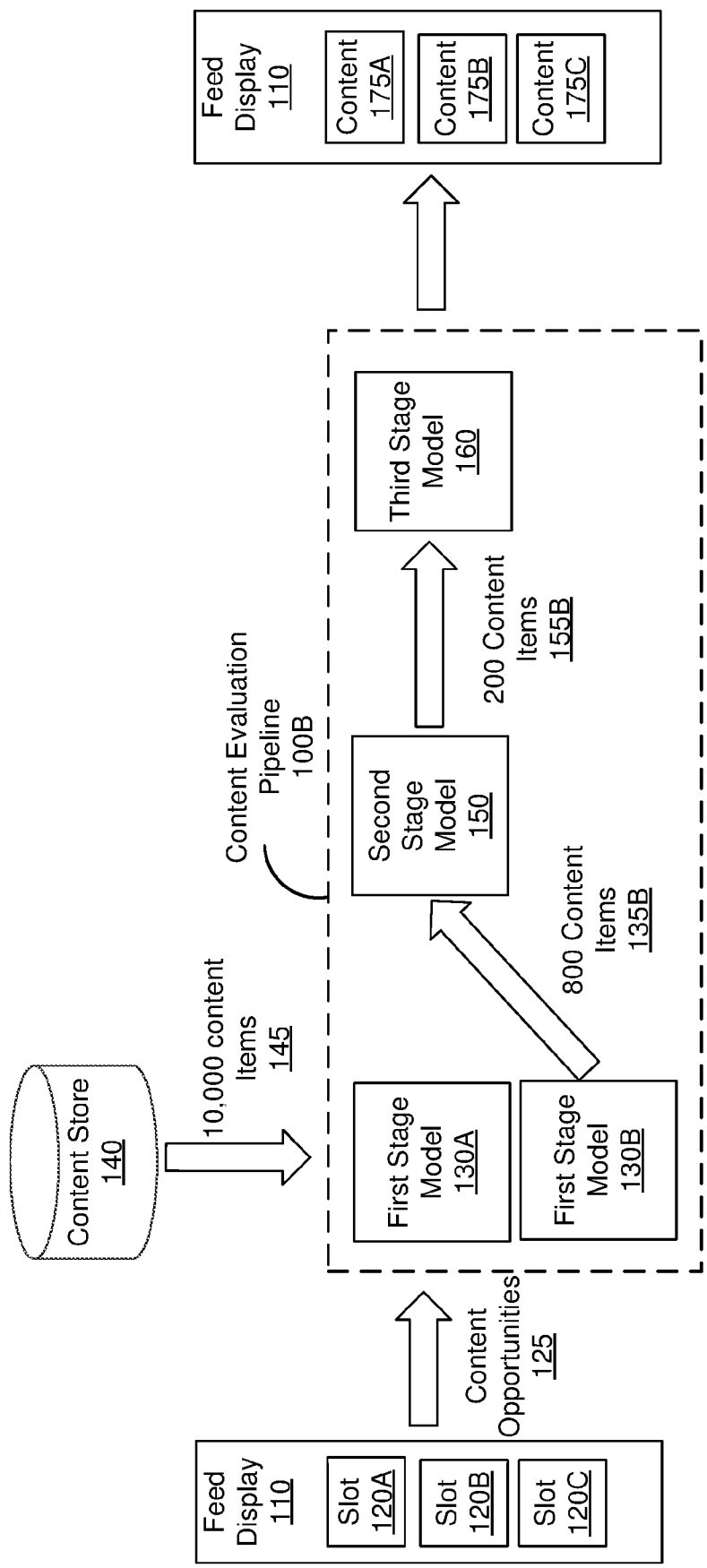
FIG. 1B is a block diagram of an environment where a content evaluation pipeline operates, in accordance with another embodiment.

FIG. 1B is a block diagram of an environment where a content evaluation pipeline 100B operates, in accordance with another embodiment. In this example, compared with the content evaluation pipeline 100A, the content evaluation pipeline 100B includes an additional first stage model 130B. In this example, the different first stage models (e.g., 130A and 130B) may represent different models to be used based on various selection characteristics, such as a type of content, user characteristic, and interaction associated with the content. For these different characteristics, different models may be applied in the first stage to evaluate the content items for the second stage. In this example, different user characteristics may determine which model is used in the first stage. Thus, when the user characteristic matches first stage model 130B, it is used rather than first stage model 130A. The first stage model 130B receives the 10,000 content items 145 and selects 800 content items 135B. The content evaluation pipeline 100B selects the 800 content items as an input for the second stage model 150 using the first stage model 130B. The second stage model 150 selects 200 content items 155B as an input for the third stage model 160 that selects three content items 175A, 175B, and 175C for presenting in the feed display 110. These different first stage models may represent different computing complexities and associated accuracy of the models. As a result, the effective pipeline used for evaluating a particular content item or for a particular user may differ. These different pipelines may provide different accuracy and require different computational requirements. Though shown here as a separate model for the user in a given stage, many different modifications to the pipeline may be implemented as discussed below to adjust the effective pipeline (and thereby computational requirements) for different selection characteristics.

Figure 2:
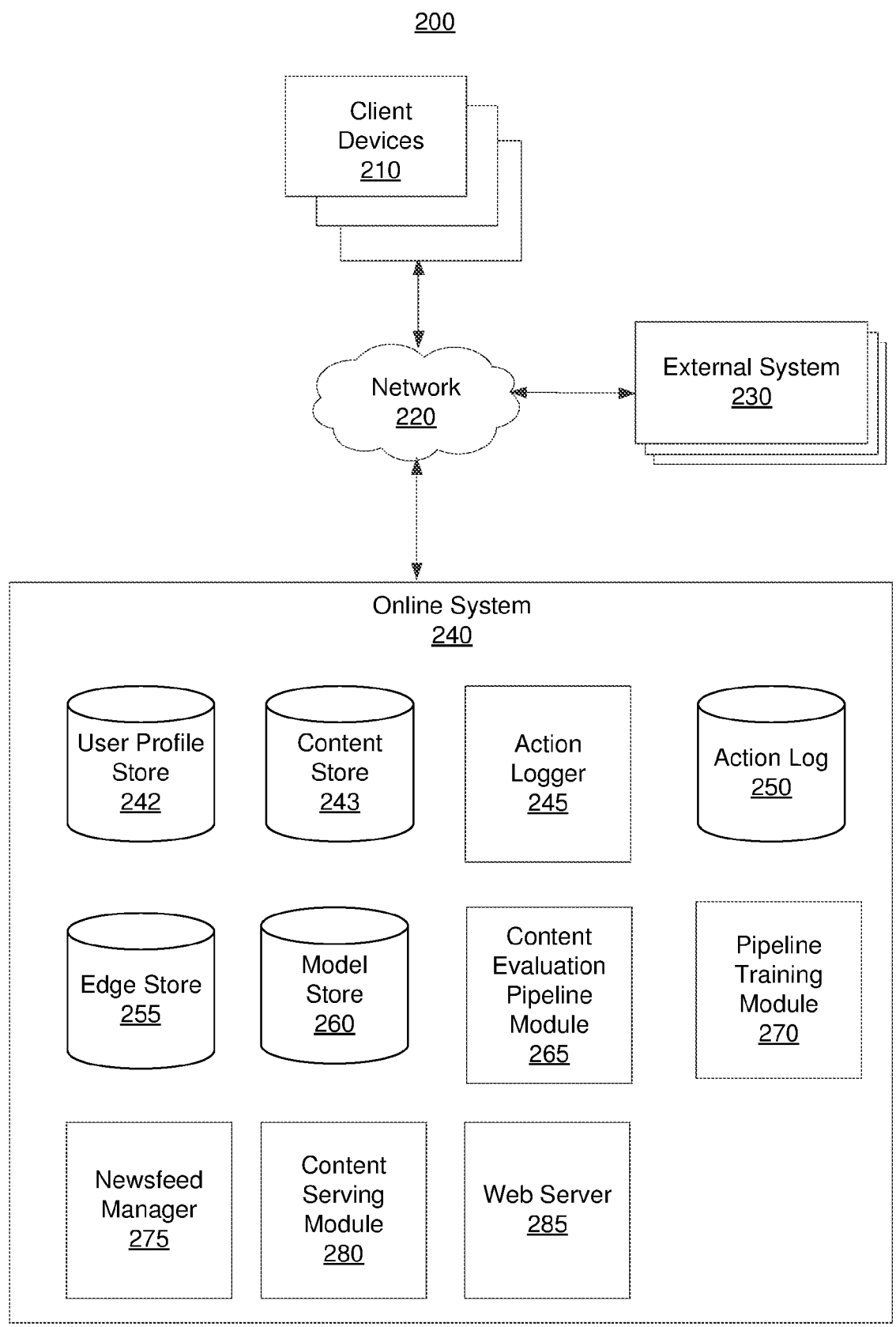
FIG. 2 is a block diagram of a system environment where an online system operates, in accordance with an embodiment.

FIG. 2 is a block diagram of a system environment 200 where an online system 240 operates, in accordance with an embodiment. The system environment 200 shown by FIG. 2 comprises one or more client devices 210, a network 220, one or more external systems 230, and the online system 240. In alternative configurations, different and/or additional components may be included in the system environment 200. For example, the online system 240 is a social networking system, a content sharing network, or another system providing content to users. The embodiments described herein can be adapted to online systems that are not social networking systems.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, a smartwatch, or another suitable device. A client device 210 is configured to communicate via the network 220. In one embodiment, a client device 210 executes an application allowing a user of the client device 210 to interact with the online system 240. For example, a client device 210 executes a browser application to enable interaction between the client device 210 and the online system 240 via the network 220. In another embodiment, a client device 210 interacts with the online system 240 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more external systems 230 may be coupled to the network 220 for communicating with the online system 240, which is further described below in conjunction with FIG. 2. In one embodiment, an external system 230 is an application provider communicating information describing applications for execution by a client device 210 or communicating data to client devices 210 for use by an application executing on the client device. In other embodiments, an external system 230 provides content or other information for presentation via a client device 210. An external system 230 may also communicate information to the online system 240, such as advertisements, content, or information about an application provided by the external system 230.

Various external systems 230 provide content to users of the online system 240. For example, an external system 230 maintains pages of content that users of the online system 240 may access through one or more applications executing on a client device 210. The external system 230 may provide content items to the online system 240 identifying content provided by the online system 240 to notify users of the online system 240 of the content provided by the external system 230. For example, a content item provided by the external system 230 to the online system 240 identifies a page of content provided by the online system 240 that specifies a network address for obtaining the page of content. If the online system 240 presents the content item to a user who subsequently accesses the content item via a client device 210, the client device 210 obtains the page of content from the network address specified in the content item.

The online system 240 optimizes one or more content evaluation pipelines to select one or more content items that are likely to have high content selection values for a given user of the online system 240. A content selection value represents how much compensation that the online system receives for presenting one or more content items selected by a content evaluation pipeline if the one or more content items are presented to a user, if the one or more content items receive a user interaction when presented, or if any suitable condition is satisfied when the one or more content items are presented to a user. For example, the content selection value is determined by a bid amount that specifies an amount of compensation the online system 240 receives from a publishing user associated with a content item, if the content item is displayed. Alternatively, the content selection value is determined by multiplying the bid amount by a prediction likelihood indicating that how likely a user will interact with a content item. Examples of content items include social networking content items (e.g., stories, photos, videos, and invitations), campaigns, and advertisements. A content evaluation pipeline uses stages to filter a very large number of content items to those that are likely to be a high content selection value for a given user. At each stage, the content evaluation pipeline evaluates, ranks, and then filers the very larger number of content items to proceed to the next stage to narrow candidate content items to a small number of content items that high content selection values.

If the online system 240 has a limited amount of compute power to effectively select content items, the fewer content items that move to the next stage, the less compute time value is required at the next stage. A compute time value represents how long the content evaluation pipeline takes to generate an output. While accounting for a complexity of the content evaluation pipeline (e.g., the more complex the content evaluation pipeline is, the higher accurate the content item selection is, and the more compute time is required), this creates a tradeoff between a complexity of the content evaluation pipeline and a compute time value. The online system optimizes the content evaluation pipelines to increase content selection values as further described below.

In the embodiment of FIG. 2, the online system 240 shown in FIG. 2 includes a user profile store 242, a content store 243, an action logger 245, an action log 250, an edge store 225, a model store 260, a content evaluation pipeline module 265, a pipeline training module 270, a newsfeed manager 275, a content serving module 280, and a web server 285. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 242. A user profile includes declarative information about the user that was explicitly shared by the user and may also include profile information inferred by the online system 240. In one embodiment, a user profile includes multiple data fields, each describing one or more attributes of the corresponding user of the online system 240. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 240 displayed in an image. A user profile in the user profile store 242 may also maintain references to actions by the corresponding user performed on content items in the content store 243 and stored in the action log 250.

While user profiles in the user profile store 242 are frequently associated with individuals, allowing individuals to interact with each other via the online system 240, user profiles may also be stored for entities such as businesses or organizations. This allows an entity to establish a presence on the online system 240 for connecting and exchanging content with other online system users. The entity may post information about itself, about its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity.

The content store 243 stores objects that each represent various types of content. Examples of content represented by an object include a page post, a status update, a photo-graph, a video, a link, a shared content item, a gaming application achievement, a check-in event at a local business, a brand page, or any other type of content. Online system users may create objects stored by the content store 243, such as status updates, photos tagged by users to be associated with other objects in the online system 240, events, groups or applications. In some embodiments, objects are received from external applications or external applications separate from the online system 240. In one embodiment, objects in the content store 243 represent single pieces of content, or content "items." Hence, online system users are encouraged to communicate with each other by posting text and content items of various types of media to the online system 240 through various communication channels. This increases the amount of interaction of users with each other and increases the frequency with which users interact within the online system 240.

One or more content items included in the content store 243 include a creative, which is content for presentation to a user, and a bid amount. As used herein, a content item including a bid amount is referred to as a "sponsored content item," while a content item (e.g., a social networking content item) that does not include a bid amount is referred to as an "organic content item." The creative is text, image, audio, video, or any other suitable data presented to a user. In various embodiments, the creative also specifies a page of content.

Various sponsored content items may include an objective identifying an interaction that a user associated with a sponsored content item desires other users to perform when presented with content included in the sponsored content item. Example objectives include: installing an application associated with a sponsored content item, indicating a preference for a sponsored content item, sharing a sponsored content item with other users, interacting with an object associated with a sponsored content item, or performing any other suitable interaction. As content from a sponsored content item is presented to online system users, the online system 240 logs interactions between users presented with the sponsored content item or with objects associated with the sponsored content item. Additionally, the online system 240 receives compensation from a publishing user associated with a sponsored content item as online system users perform interactions with the sponsored content item that satisfy the objective included in the sponsored content item.

Additionally, a sponsored content item may include one or more targeting criteria specified by the publishing user who provided the sponsored content item to the online system 240. Targeting criteria included in a sponsored content item request specify one or more characteristics of users eligible to be presented with the sponsored content item. For example, targeting criteria are used to identify users having user profile information, edges, or actions satisfying at least one of the targeting criteria. Hence, targeting criteria allow a publishing user to identify users having specific characteristics as eligible to be presented with content from a sponsored content item, simplifying subsequent distribution of content to different users.

In one embodiment, targeting criteria may specify actions or types of connections between a user and another user or object of the online system 240. Targeting criteria may also specify interactions between a user and objects performed external to the online system 240, such as on an external system 230. For example, targeting criteria identifies users who have taken a particular action, such as sent a message to another user, used an application, joined a group, left a group, joined an event, generated an event description, purchased or reviewed a product or service using an online marketplace, requested information from an external system 230, installed an application, or performed any other suitable action. Including actions in targeting criteria allows publishing users to further refine users eligible to be presented with sponsored content items. As another example, targeting criteria identifies users having a connection to another user or object or having a particular type of connection to another user or object.

The action logger 245 receives communications about user actions internal to and/or external to the online system 240, populating the action log 250 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 250.

The action log 250 may be used by the online system 240 to track user actions on the online system 240, as well as actions on external systems 230 that communicate information to the online system 240. Users may interact with various objects on the online system 240, and information describing these interactions is stored in the action log 250. Examples of interactions with objects include: commenting on posts, sharing links, checking-in to physical locations via a client device 210, accessing content items, and any other suitable interactions. Additional examples of interactions with objects on the online system 240 that are included in the action log 250 include: commenting on a photo album, communicating with a user, establishing a connection with an object, joining an event, joining a group, creating an event, authorizing an application, using an application, expressing a preference for an object ("liking" the object), expressing a reaction to an object, and engaging in a transaction. Additionally, the action log 250 may record a user's interactions with advertisements on the online system 240 as well as with other applications operating on the online system 240. In some embodiments, data from the action log 250 is used to infer interests or preferences of a user, augmenting the interests included in the user's user profile and allowing a more complete understanding of user preferences.

The action log 250 may also store user actions taken on an external system 230, such as an external website, and communicated to the online system 240. For example, an e-commerce website may recognize a user of an online system 240 through a social plug-in enabling the e-commerce website to identify the user of the online system 240. Because users of the online system 240 are uniquely identifiable, e-commerce websites, such as in the preceding example, may communicate information about a user's actions outside of the online system 240 to the online system 240 for association with the user. Hence, the action log 250 may record information about actions users perform on an external system 230, including webpage viewing histories, advertisements or other content with which the user engaged, purchases made, and other patterns from shopping and buying. Hence, the action log 250 may include information identifying content provided by one or more external systems 230 that a user of the online system 240 has accessed or content provided by one or more external systems 230 with which the user of the online system 240 otherwise interacted. Various external systems 230 may include tracking mechanisms in content comprising instructions that, when executed by a client device 210, provide information identifying the content and identifying a user of the online system 240 associated with the client device 210 to the online system 240. In various embodiments, the information provided by the tracking mechanism identifies one or more products associated with an external system 230 and include in, or otherwise associated with, the identified content. The information identifying the content is stored in the action log 250 in association with information identifying the user to the online system 240. Additionally, actions a user performs via an application associated with an external system 230 and executing on a client device 210 may be communicated to the action logger 245 by the application for recordation and association with the user in the action log 250.

In one embodiment, the edge store 255 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240. Users and objects within the online system 240 can represented as nodes in a social graph that are connected by edges stored in the edge store 255.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 240, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 255 also stores information about edges, such as affinity scores for objects, interests, and other users. Affinity scores, or "affinities," may be computed by the online system 240 over time to approximate a user's affinity for an object, interest, and other users in the online system 240 based on the actions performed by the user. A user's affinity may be computed by the online system 240 over time to approximate a user's affinity for an object, interest, and other users in the online system 240 based on the actions performed by the user. Computation of affinity is further described in U.S. Pat. Application No. 12/978,265, filed on Dec. 23, 2010, U.S. Pat. Application No. 13/690,254, filed on Nov. 30, 2012, U.S. Pat. Application No. 13/689,969, filed on Nov. 30, 2012, and U.S. Pat. Application No. 13/690,088, filed on Nov. 30, 2012, each of which is hereby incorporated by reference in its entirety. Multiple interactions between a user and a specific object may be stored as a single edge in the edge store 255, in one embodiment. Alternatively, each interaction between a user and a specific object is stored as a separate edge. In some embodiments, connections between users may be stored in the user profile store 242, or the user profile store 242 may access the edge store 255 to determine connections between users.

The model store 260 stores various computer models to evaluate a likelihood of user interaction with a content item. Examples of a computer model include a machine learning model (e.g., a supervised machine learning model, or an unsupervised machine learning model), a deep learning model (e.g., a neural network model). The model store 260 also stores training datasets for training the various computer models.

The content evaluation pipeline module 265 generates one or more content evaluation pipelines. The content evaluation pipeline module 265 generates rules to generate a content evaluation pipeline that includes an order of a plurality of stages each having one or more computer models and selects a decreasing number of content items, from each stage of the order, according to the order of the stages. The rules may include the number of stages, the order of stages, the number of computer models for a stage, the number of content items selected from a stage, a rule to select one or more computer models from the model store 260 for a stage, or a rule to select one or more computer models in a stage for delivering content items to the next stage (e.g., a rule to select a more complex model in a stage for delivering content items to the next stage). For example, in one embodiment, the rules may specify a content evaluation pipeline 100A with three stages, each stage including a computer model. The first stage model 130A may be a simple model that receives a large number (e.g., 10,000) of content items and thus requires significant compute power. The second stage model 150 may have greater computing complexity than the first stage model 130A and require less compute power to select from the 800 input content items. Finally, the third stage model 160 may require the least compute power of the three models to accurately select from 200 input content items the three content items that are likely to be of the highest value for a given user.

The pipeline training module 270 trains the models in the content evaluation pipeline 100A to mimic the output of later, more complex models, thereby optimizing the selection of content items provided to subsequent stages of the content evaluation pipeline 100A as well as the content items ultimately selected for display to a given user of the online system 240 in the feed display 110.

The pipeline training module 270 applies machine learning techniques to train the first stage model 130A and the second stage model 150 to output predicted content selection values for content items under consideration for display to a given user. As part of the training, the pipeline training module 270 forms a training set of content items by identifying a positive set of content items that would be selected for input to a subsequent model and, in some embodiments, forms a negative training set of content items that would not be selected for subsequent processing. In one embodiment, training data for a model is generated by inputting training content items to the subsequent model in the content evaluation pipeline 100A. For example, to train the first stage model 130A, the pipeline training module 270 feeds to the second stage model 150 a first training set of content items for which a given user satisfies the targeting criteria. For each content item in the first training set, the second stage model 150 calculates a content selection value, as discussed above. In one embodiment, the content selection value represents the amount of compensation that the online system 240 would receive if a suitable condition is satisfied when one or more content items are presented to the user (e.g., if the user interacts with a content item). Alternatively, the content selection value is determined by multiplying a bid amount for a content item by a prediction likelihood indicating how likely a given user is to interact with the content item.

The second stage model 150 selects the content items with the highest content selection values to continue in the content selection pipeline 100A. For example, if the second stage model 150 receives as input 800 training content items, the second stage model 150 selects the content items with the 200 highest content selection values for input to the third stage model 160. The pipeline training module 270 uses machine learning to train the first stage model 130A with the content selection values in the first training set serving as the input. Different machine learning techniques—such as linear support vector machine (linear SVM), boosting for other algorithms (e.g., AdaBoost), neural networks, logistic regression, naive Bayes, memory-based learning, random forests, bagged trees, decision trees, boosted trees, or boosted stumps— may be used in different embodiments.

The second stage model 150 is similarly trained to predict the output of the third stage model 160. For example, for the 200 content items in the content evaluation pipeline 100A that would be input to the third stage model 160, the second stage model 150 is trained to predict the content selection value that the third stage model 160 would calculate for each content item and thus which three content items the third stage model 160 would select for display to a given user in the feed display 110.

To train the second stage model 150, the pipeline training module 270 forms a second training set of content items for which the given user satisfies the targeting criteria and inputs the content items to the third stage model 160. The third stage model 160 calculates a content selection value for each content item in the second training set and outputs the content selection values and an indication of which three content items from the second training set would be of the highest value for a given user. The pipeline training module 270 then trains the second stage model 150 using the content selection values from the second training set serving as the input. In other embodiments, the pipeline training module 270 trains the models in the content evaluation pipeline 100A from most to least complex (i.e., trains the third stage model 160 on the second training set, then trains the second stage model 150 based on predicted values from the trained third stage model 160, then trains the first stage module 130A based on predicted values from the trained second stage model 150.

The newsfeed manager 280 may generate content for presentation to a user based on information in the action log 250 and in the edge store 255 or may select candidate stories included in content store 243. One or more of the candidate stories are selected and presented to a user by the newsfeed manager 280.

For example, the newsfeed manager 280 receives a request to present one or more stories to an online system user. The newsfeed manager 280 accesses one or more of the user profile store 242, the content store 243, the action log 250, and the edge store 255 to retrieve information about the identified user. For example, stories or other data associated with users connected to the identified user are retrieved. The retrieved stories or other data is analyzed by the newsfeed manager 280 to identify content likely to be relevant to the identified user. For example, stories associated with users not connected to the identified user or stories associated with users for which the identified user has less than a threshold affinity are discarded as candidate stories. Based on various criteria, the newsfeed manager 280 selects one or more of the candidate stories for presentation to the identified user.

In various embodiments, the newsfeed manager 280 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 242. The newsfeed manager 280 may also determine the order in which selected stories are presented via the newsfeed. For example, the newsfeed manager 280 determines that a user has a highest affinity for a specific user and increases the number of stories in the newsfeed associated with the specific user or modifies the positions in the newsfeed where stories associated with the specific user are presented.

The newsfeed manager 280 may also account for actions by a user indicating a preference for types of stories and selects stories having the same, or similar, types for inclusion in the newsfeed. Additionally, newsfeed manager 280 may analyze stories received by an online system 240 from various users and obtains information about user preferences or actions from the analyzed stories. This information may be used to refine subsequent selection of stories for newsfeeds presented to various users.

The content serving module 285 receives content items from the various external systems 230 for provision to users to whom the content would be relevant and delivers appropriate content items to users, and stores the received content items in the content store 243. The content serving module 285 sends the received content items to the content evaluation pipeline module 265 to select one or more content items to be delivered to the client device 210 for presentation to the user. For example, when an opportunity arises to present a content item to the user, the content evaluation pipeline module 265 selects a content item that a user is most likely to perform actions on (e.g., clicking on the content item, visiting a website via clicking on the content item, placing the content item in a virtual shopping cart, or purchasing the content item). The content serving module 285 delivers the selected content item to the user for the opportunity.

The web server 290 links the online system 240 via the network 220 to the one or more client devices 210, as well as to the one or more external systems 230. The web server 290 serves web pages, as well as other web-related content, such as JAVA®, FLASH®, XML and so forth. The web server 290 may receive and route messages between the online system 240 and the client device 210, for example, instant messages, queued messages (e.g., email), text messages, short message service (SMS) messages, or messages sent using any other suitable messaging technique. A user may send a request to the web server 290 to upload information (e.g., images or videos) that are stored in the content store 243. Additionally, the web server 290 may provide application programming interface (API) functionality to send data directly to native client device operating systems, such as IOS®, ANDROID™, WEBOS® or RIM®.

Figure 3:
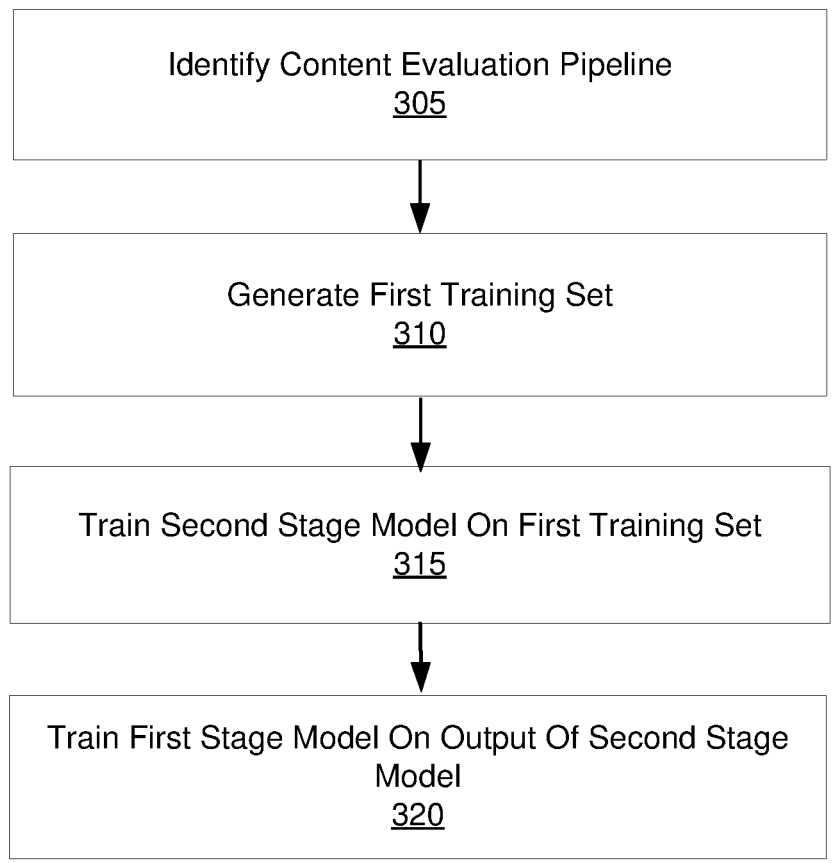
FIG. 3 is a flowchart illustrating a process for training a first stage model in the content evaluation pipeline, in accordance with an embodiment.

FIG. 3 is a flowchart illustrating a process 300 for training a first stage model 130A in the content evaluation pipeline 100A, in accordance with an embodiment. The process 300 may be performed by the online system 240. The process 300 may include different or additional steps than those described in conjunction with FIG. 3 in some embodiments or perform steps in different orders than the order described in conjunction with FIG. 3.

The online system 240 identifies 305 a content evaluation pipeline 100A comprising an order of a plurality of stages having one or more computer models for evaluating a likelihood of user interaction with a content item, and the content evaluation pipeline 100A selects a decreasing number of content items, from each stage of the order, according to the order of the stages in the order. Examples of a content evaluation pipeline 100A are described above with respect to FIGS. 1A and 1B. For example, in one embodiment, the content evaluation pipeline 100A includes three stages, each having a computer model (e.g., a first stage model 130A, a second stage model 150, and a third stage model 160) for evaluating the likelihood that a content item is likely to be of high value to a given user.

At 310, the pipeline training module 270 generates a first training set of content items for which a given user satisfies the targeting criteria. For example, the first training set of content items might include sponsored content items for which the user has satisfied the targeting criteria by taking a particular action, such as using an application, joining a group, purchasing a product, installing an application, or performing any other suitable action. In one embodiment, the first training set contains 800 content items, although more or fewer content items may be used in other embodiments.

The pipeline training module 150 trains 315 the second stage model 150 on the first training set, as described above with respect to FIG. 2. For each of the 800 content items in the first training set, the second stage model 150 generates a content selection value based in part on a likelihood that a given user will interact with the content item and outputs an indication of the content selection values and the 200 content items with the highest content selection values that would be selected for input to the subsequent model in the content evaluation pipeline 100A. In one embodiment, the second stage model 150 outputs, for each content item, a content selection value between zero and one. Alternatively, the second stage model 150 provides a range of values representing a possible distribution of content selection values for each content item.

At 320, the pipeline training module 270 uses machine learning to train the first stage model 130A to mimic the output of the second stage model 150. The first stage model 130A is trained to predict the content selection value or range of values that the second stage model 150 would assign to a given content item to optimize the functioning of the content evaluation pipeline 100A and the ultimate selection of content items for a given user.

Figure 4:
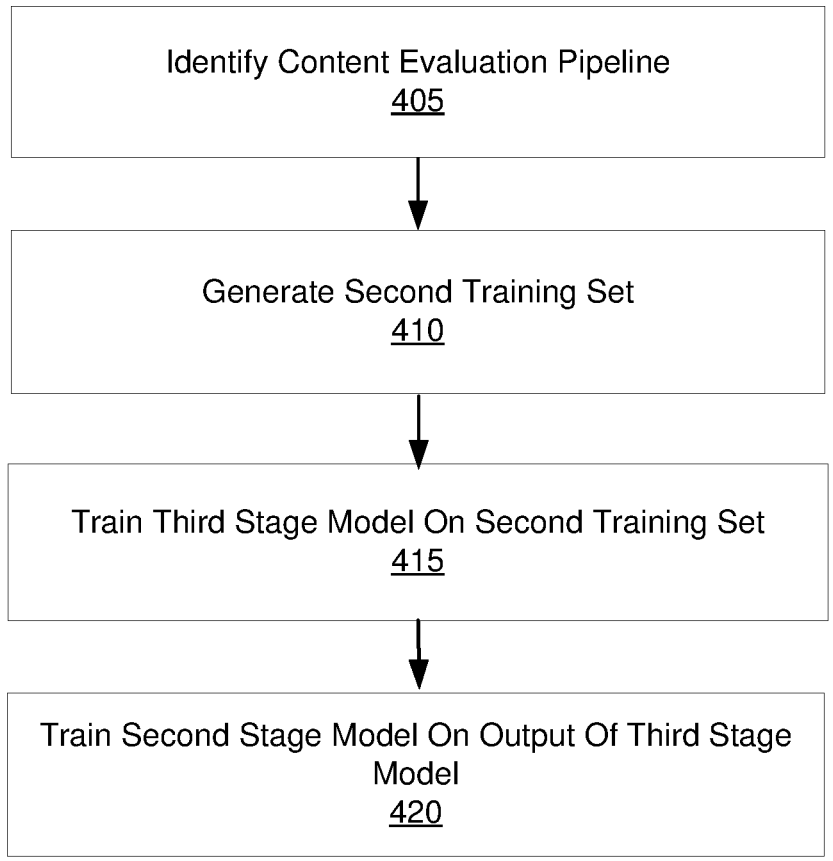
FIG. 4 is a flowchart illustrating a process for training a second stage model in the content evaluation pipeline, in accordance with an embodiment.

FIG. 4 is a flowchart illustrating a process for training a second stage model 150 in the content evaluation pipeline 100A, in accordance with an embodiment. The process 400 may be performed by the online system 240. The process 400 may include different or additional steps than those described in conjunction with FIG. 4 in some embodiments or perform steps in different orders than the order described in conjunction with FIG. 4. Further, the process 400 may occur after the process 300, in parallel with the process 300, or before the process 300.

The online system 240 identifies 405 a content evaluation pipeline 100A comprising an order of a plurality of stages having one or more computer models for evaluating a likelihood of user interaction with a content item, and the content evaluation pipeline 100A selects a decreasing number of content items, from each stage of the order, according to the order of the stages in the order. Examples of a content evaluation pipeline are described above in FIGS. 1A and 1B. For example, in one embodiment, the content evaluation pipeline 100A includes three stages, each having a computer model (e.g., a first stage model 130A, a second stage model 150, and a third stage model 160) for evaluating the likelihood that a content item is likely to be of high value to a given user. In some embodiments, the content evaluation pipeline 100A is the same content evaluation pipeline 100A discussed above with respect to FIG. 3.

At 410, the pipeline training module 270 generates a second training set of content items for which a given user satisfies the targeting criteria. In one embodiment, the second training set contains 200 content items, although more or fewer content items may be used in other embodiments.

The pipeline training module 150 trains 415 the third stage model 160 on the second training set, as described above with respect to FIG. 2. For each of the 200 content items in the second training set, the third stage model 160 generates a content selection value based in part on a likelihood that a given user will interact with the content item and outputs an indication of the content selection values and the 3 content items with the highest selection values that would be selected for display to the user. In one embodiment, the third stage model 160 outputs, for each content item, a content selection value between zero and one. Alternatively, the third stage model 160 provides a range of values representing a possible distribution of content selection values for each content item.

At 420, the pipeline training module 270 uses machine learning to train the second stage model 150 to mimic the output of the third stage model 160. The second stage model 150 is trained to predict the content selection value or range of values that the third stage model 160 would assign to a given content item to optimize the functioning of the content evaluation pipeline 100A and the ultimate selection of content items for a given user.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method performed by an online system, the method comprising:
    identifying a content evaluation pipeline comprising a plurality of ordered stages including a first stage, a second stage, and a third stage, each stage having one or more machine learning models for evaluating a likelihood of user interaction with content items, the content evaluation pipeline selecting a decreasing number of content items for evaluation at each subsequent stage of the ordered stages, wherein a set of content items are input into the first stage, content items output from the first stage are input into the second stage, and content items output by the second stage are input to the third stage;
    generating a first training set of content items, inputting the first training set to a second stage model of the second stage of the plurality of ordered stages, the second stage model generating content selection values for the first training set and
    selecting, using the content selection values, a subset of the first training set to input to a third stage model of the third stage of the plurality of ordered stages;
    training a first stage model of the first stage of the plurality of ordered stages to predict the output of the second stage model, the first stage model trained on the content selection values and the subset of the first training set selected by the second stage model;
    generating a second training set of content items for which the user satisfies targeting criteria; inputting the second training set to the third stage model in the content evaluation pipeline, the third stage model generating second content selection values for the second training set and selecting, using the second content selection values, a subset of the second training set for display to the user; and
    training the second stage model in the content selection pipeline to predict the output of the third stage model, the second stage model trained on the second content selection values and the subset of the second training set selected by the third stage model for display to the user.

2. The computer-implemented method of claim 1, wherein the one or more machine learning models of each stage comprise a plurality of machine learning models, the plurality of machine learning models including a plurality of deep learning models.

3. The computer-implemented method of claim 1, wherein generating the content selection value comprises: determining a prediction likelihood indicating how likely the user is to interact with the content; and multiplying a bid amount with the determined prediction likelihood.

4. The computer-implemented method of claim 1, wherein each of the content selection values comprise an amount of compensation that the online system would receive if a suitable condition is satisfied when a corresponding content item is displayed to the user.

5. The computer-implemented method of claim 1, wherein the second stage model generates a range of content selection values for each content item in the first training set.

6. The computer-implemented method of claim 1, wherein the third stage model generates a range of content selection values for each content item in the second training set.

7. A non-transitory computer-readable medium comprising computer program instructions that when executed by a computer processor of an online system causes the processor to perform steps comprising:
    receiving, by the online system, a request for a content item;
    identifying a content evaluation pipeline comprising a plurality of ordered stages including a first stage, a second stage, and a third stage, each stage having one or more machine learning models for evaluating a likelihood of user interaction with content items, the content evaluation pipeline selecting a decreasing number of content items for evaluation at each subsequent stage of the ordered stages
    inputting a first set of content items into the first stage, the first stage evaluating, ranking, and filtering the first set of content items to output a second set of content items, wherein the second set of content items is a filtered subset of the first set of content;
    inputting the second set of content items to the second stage, the second stage evaluating, ranking, and filtering the second set of content items to output a third set of content items, wherein the third set of content items is a filtered subset of the second set of content items;
    inputting the third set of content items to the third stage, the third stage evaluating, ranking, and filtering the thirds set of content items to output a selection of content items, wherein the selection of content items is a filtered subset of the third set of content items; and providing, to a user of the online system, the selection of content items;
    wherein the plurality of ordered stages of the content evaluation pipeline were trained by a process comprising:
        generating a first training set of content items;
        inputting the first training set to a second stage model of the second stage of the plurality of ordered stages, the second stage model generating content selection values for the first training set and selecting, using the content selection values, a subset of the first training set to input to a third stage model of the third stage of the plurality of ordered stages;
        training a first stage model of the first stage of the plurality of ordered stages to predict the output of the second stage model, the first stage model trained on the content selection values and the subset of the first training set selected by the second stage model;

generating a second training set of content items for which the user satisfies targeting criteria;

inputting the second training set to the third stage model in the content evaluation pipeline, the third stage model generating second content selection values for the second training set and selecting, using the second content selection values, a subset of the second training set for display to the user; and training the second stage model in the content selection pipeline to predict the output of the third stage model, the second stage model trained on the second content selection values and the subset of the second training set selected by the third stage model for display to the user.

8. The non-transitory computer-readable medium of claim 7, wherein the one or more machine learning models of each stage comprise a plurality of machine learning models, the plurality of machine learning models including a plurality of deep learning models.

9. The non-transitory computer-readable medium of claim 7, wherein generating the content selection value comprises: determining a prediction likelihood indicating how likely the user is to interact with the content; and multiplying a bid amount with the determined prediction likelihood.

10. The non-transitory computer-readable medium of claim 7, wherein each of the content selection values comprise an amount of compensation that the online system would receive if a suitable condition is satisfied when a corresponding content item is displayed to the user.

11. The non-transitory computer-readable medium of claim 7, wherein the second stage model generates a range of content selection values for each content item in the first training set.

12. The non-transitory computer-readable medium of claim 7, wherein the third stage model generates a range of content selection values for each content item in the second training set.

13. A system comprising: a processor; and a non-transitory computer-readable medium comprising computer program instructions that when executed by the processor of an online system causes the processor to perform steps comprising:

identifying a content evaluation pipeline comprising a plurality of ordered stages including a first stage, a second stage, and a third stage, each stage having one or more machine learning models for evaluating a likelihood of user interaction with content items, the content evaluation pipeline selecting a decreasing number of content items for evaluation at each subsequent stage of the ordered stages, wherein a set of content items input into the first stage, content items output from the first stage are input into the second stage, and content items output by the second stage are input to the third stage;

generating a first training set of content items, inputting the first training set to a second stage model of the second stage of the plurality of ordered stages, the second stage model generating content selection values for the first training set and selecting, using the content selection values, a subset of the first training set to input to a third stage model of the third stage of the plurality of ordered stages;

training a first stage model of the first stage of the plurality of ordered stages to predict the output of the second stage model, the first stage model trained on the content selection values and the subset of the first training set selected by the second stage model;

generating a second training set of content items for which the user satisfies targeting criteria;

inputting the second training set to the third stage model in the content evaluation pipeline, the third stage model generating second content selection values for the second training set and selecting, using the second content selection values, a subset of the second training set for display to the user; and training the second stage model in the content selection pipeline to predict the output of the third stage model, the second stage model trained on the second content selection values and the subset of the second training set selected by the third stage model for display to the user.

14. The system of claim 13, wherein the one or more machine learning models of each stage comprise a plurality of machine learning models, the plurality of machine learning models including a plurality of deep learning models.

15. The system of claim 13, wherein generating the content selection value comprises: determining a prediction likelihood indicating how likely the user is to interact with the content; and multiplying a bid amount with the determined prediction likelihood.

16. The system of claim 13 wherein each of the content selection values comprise an amount of compensation that the online system would receive if a suitable condition is satisfied when a corresponding content item is displayed to the user.

17. The system of claim 13, wherein the second stage model generates a range of content selection values for each content item in the first training set.

* * * * *